(12) United States Patent
Caraballo

(10) Patent No.: US 6,805,792 B1
(45) Date of Patent: Oct. 19, 2004

(54) POOL CLEANER CONTROL DEVICE

(76) Inventor: Abelardo Caraballo, 3381 SW. 130th Ave., Miami, FL (US) 33175

( * ) Notice: Subject to any disclaimer, the term of this patent is extended or adjusted under 35 U.S.C. 154(b) by 0 days.

(21) Appl. No.: 10/765,333

(22) Filed: Jan. 28, 2004

(51) Int. Cl.[7] .............................. E04H 4/12; B01D 35/02
(52) U.S. Cl. .................... 210/169; 210/259; 210/416.2; 4/490
(58) Field of Search .......................... 210/98, 138, 143, 210/169, 232, 252, 259, 416.1, 416.2; 4/490, 496

(56) References Cited

U.S. PATENT DOCUMENTS

| | | | | |
|---|---|---|---|---|
| 3,581,895 A | * | 6/1971 | Howard et al. ............. | 210/108 |
| 4,188,673 A | * | 2/1980 | Carter .................... | 134/167 R |
| 4,686,728 A | * | 8/1987 | Rawlins ........................ | 15/1.7 |
| 4,776,953 A | * | 10/1988 | Frentzel ...................... | 210/169 |
| 5,154,821 A | * | 10/1992 | Reid .......................... | 210/169 |
| 5,581,826 A | * | 12/1996 | Edwards ........................ | 4/507 |
| 6,495,034 B1 | * | 12/2002 | Schmidtke et al. ......... | 210/169 |

FOREIGN PATENT DOCUMENTS

EP          0846817 A1 *   6/1998

* cited by examiner

Primary Examiner—Fred G. Prince
(74) Attorney, Agent, or Firm—J. Sanchelima; A. Bordas

(57) ABSTRACT

A device for switching between two inlet ports in a skimmer submerged in a body of water so that the latter can be cleaned (filtered) from two different areas. A conventional skimmer has first housing with a filter basket mounted therein and a second housing mounted within the first housing below a cover assembly centrally mounted within the first housing. A vertically movable piston assembly movable within the second housing and with an upright elongated tubular shaft that slides through a shaft opening in the cover activates a valve when the piston approaches its uppermost position closing one of the two inlet ports in the cover. The speed at which the piston assembly moves upwardly to close the first inlet is regulated with a restricting valve at the upper end of the tubular shaft. The result being to change the active inlet ports allowing the cleaning of the body of water from two inlet locations.

6 Claims, 5 Drawing Sheets

POOL CLEANER CONTROL DEVICE

BACKGROUND OF THE INVENTION

1. Field of the Invention

The present invention relates to a pool cleaner control device, and more particularly, to a control device for pool skimmers used to filter the water in a body of water, such as a swimming pool.

2. Description of the Related Art

Several designs for pool cleaner devices have been designed in the past. These devices are generally referred to as skimmers and they typically include a filter basket assembly that collects debris from the body of water they clean. The inlet is typically connected to a hose that sucks the water from an area of a body of water. This inherently limits the cleaning operation to one inlet port only. The present invention includes a device used with skimmers that permits a user to switch from two active ports or inlets after a predetermined period of time. This permits a user to process (filter) water from two different areas.

SUMMARY OF THE INVENTION

It is one of the main objects of the present invention to provide a control device for switching the operation of a skimmer between two inlet ports connected to a body of water thereby permitting a user to clean the water from two separate areas.

It is another object of this invention to provide a device that works with skimmers to filter the water in a pool.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
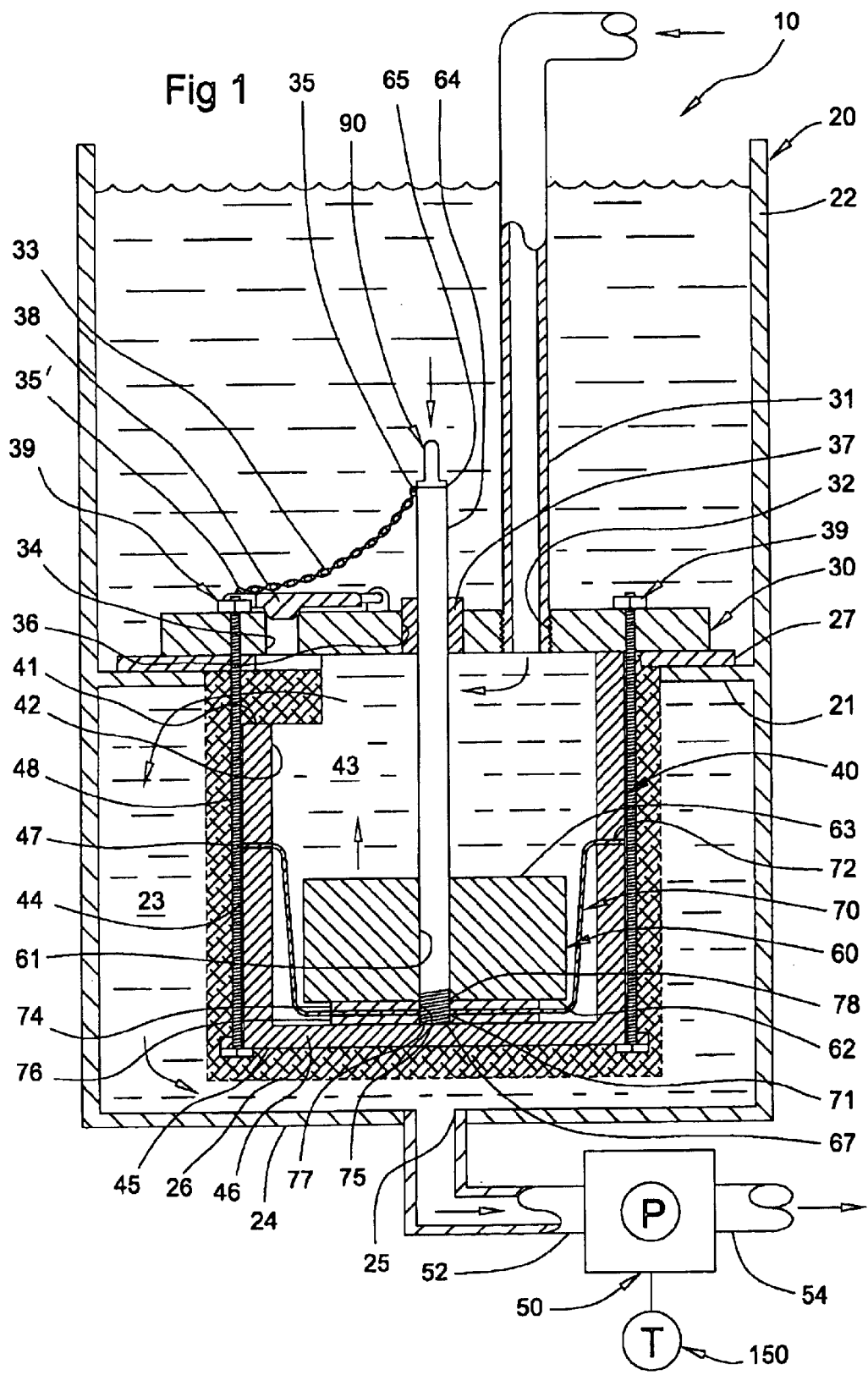
FIG. 1 represents a partial cross-sectional view of the preferred embodiment for the present invention where the inlet connected to the hose is operational.

Referring now to the drawings, where the present invention is generally referred to with numeral 10, it can be observed that it basically includes skimmer assembly 20, cover assembly 30, housing assembly 40, electrical suction pump 50, piston assembly 60 and flexible diaphragm skirt 70, as shown in FIG. 1. Timer assembly 150 is used to set predetermined operation time intervals.

As seen in FIG. 1, skimmer assembly 20 includes cylindrical housing 22 with bottom wall 24 and filter basket assembly 26 housed therein. Filter basket assembly 26 includes outwardly extending peripheral flange 27, which is mounted to inwardly extending supporting flange 21 of housing 22. Bottom wall 24 includes bottom outlet port 25.

Cover assembly 30 includes inlet through openings 32 and 34 and shaft through opening 36. Hose 31 has one end mounted to inlet through opening 32 and its distal end suctions the water from the bottom of the swimming pool at a remote location. Cover assembly 30 also includes hingedly mounted valve assembly 38 for selectively closing inlet through opening 34. Actuating member 33 has ends 35 and 35'. End 35 is attached to upper end 65 of elongated tubular shaft 64 and end 35 is cooperatively engaged to the distal end of valve assembly 38 to open and close the latter in response to the position of upper end 65. Cover 30 and inwardly extending supporting flange 21 sandwich flange 27. Thus, there are only three openings through which water enters housing assembly 40.

Housing assembly 40 is mounted within filter basket assembly 26 of skimmer assembly 20 and held in place with fasteners 39 that pass through cover 30. Housing assembly 40 includes internal wall 42. In the preferred embodiment, housing assembly 40 includes lower and upper cylindrical members 44 and 48, respectively, coaxially mounted. Cylindrical members 44 and 48 are longitudinally and abbutingly mounted with respect to each other. Lower cylindrical member 44 includes ends 45 and 47. End 45 is closed with bottom wall 46 and end 47 is open. Upper cylindrical member 48 is open at both ends and includes cutout 41.

Electrical suction pump 50 includes inlet 52 and outlet 54. Inlet 52 is connected to outlet port 25 of bottom wall 24. The suctioned and filtered water returns to the body of water through outlet 54.

Figure 3:
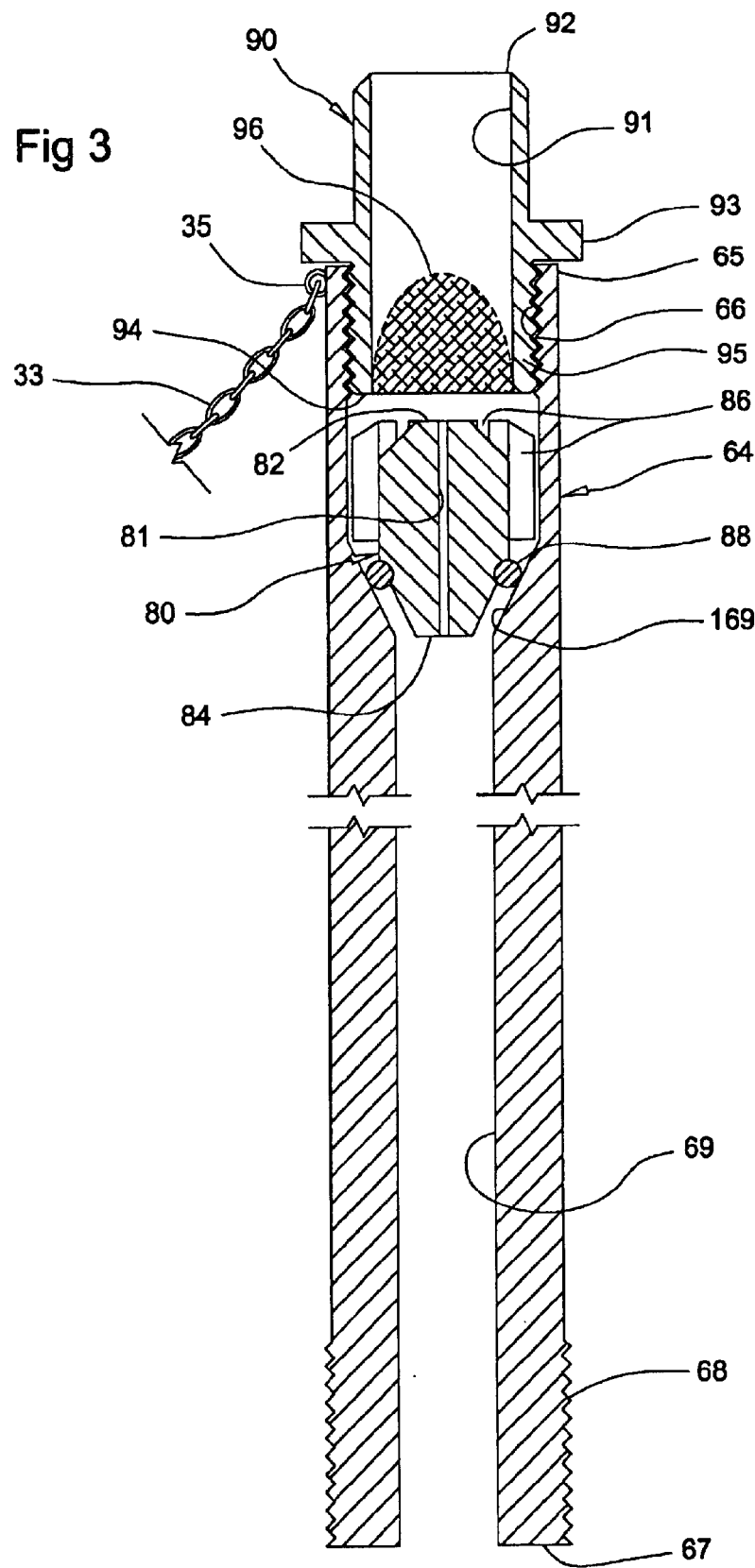
FIG. 3 illustrates an enlarged cross-sectional view of the piston's shaft, showing the restricting valve assembly and the filter cap assembly used for the present invention.

Piston assembly 60 is housed within lower cylindrical member 44 in FIG. 1. Piston assembly 60 includes bottom surface 62 and top surface 63. Shaft 64 is perpendicularly with respect to surface 63 and passes through piston assembly 60. Elongated tubular shaft 64 passes through central opening 36. Sealing sleeve 37 is secured to opening 36 to permit shaft 64 to go through. Elongated tubular shaft 64 has cooperative dimensions to slidably and sealingly passes through sleeve 37. As best seen in FIG. 3, shaft 64 includes upper end 65 with internal threaded portion 66 and lower end 67 has external threaded portion 68. Central through opening 69 includes conical recess 169 ending with a larger internal at end 65.

Lower plate 76 and upper plate 74 include cooperative central threaded openings 75 and 77 that receive threaded portion 68. One of their functions is to secure shaft 64.

Upper plate 74 is mounted against bottom surface 62 and with lower plate 76 sandwiching skirt 70. Lower plate 76 comes in contact with bottom wall 46 at the lowermost position of piston assembly 60.

Figure 2:
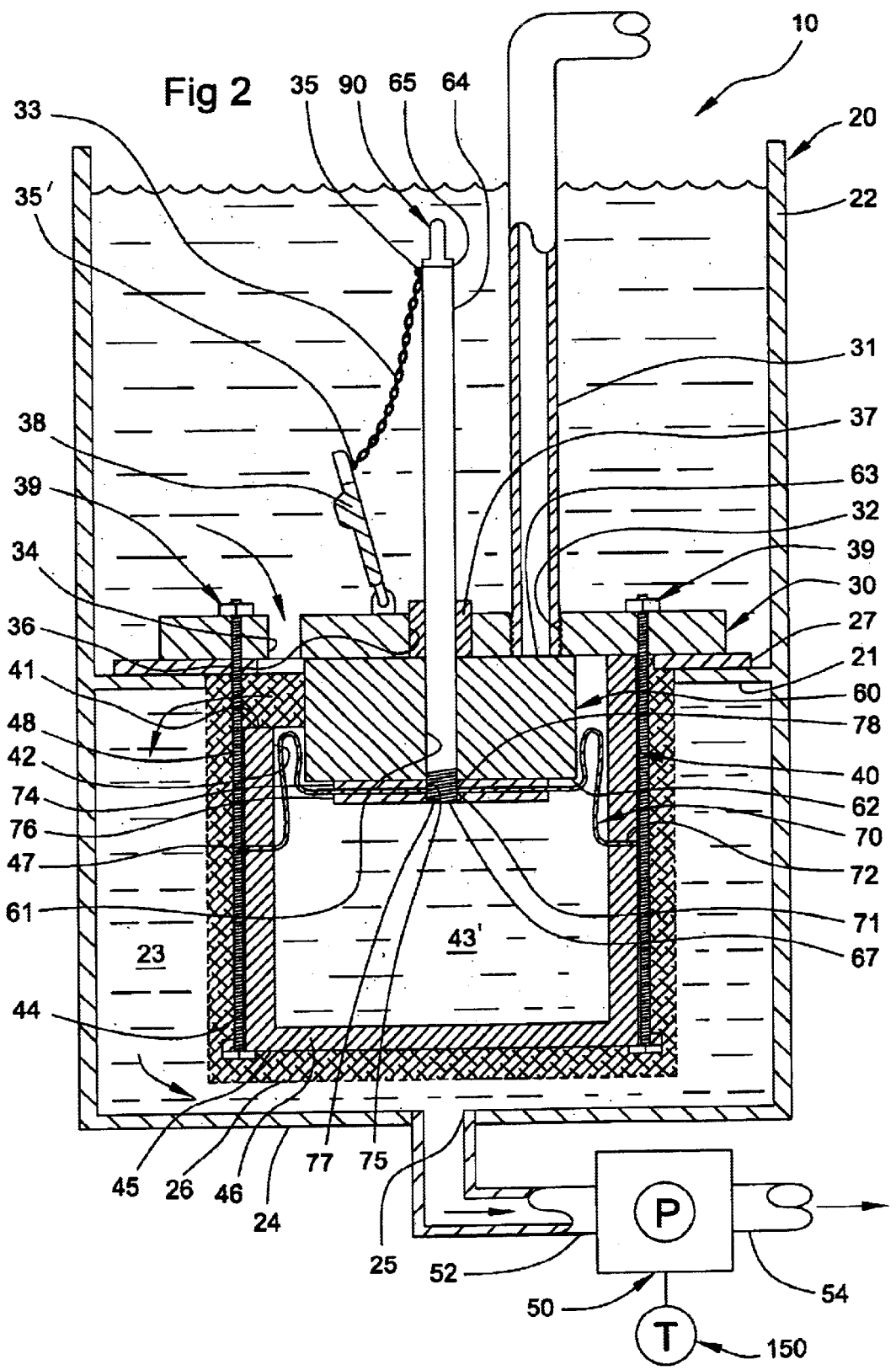
FIG. 2 shows the partial cross-sectional view of FIG. 1 in the opposite position with the inlet connected to the hose is blocked and the other inlet operational.

In the preferred embodiment shown in FIGS. 1 and 2, a flexible diaphragm skirt 70 has a substantially hemispherical shape covering piston assembly 60. Flexible diaphragm skirt 70 includes central opening 71 and peripheral edge 72. Flexible diaphragm skirt 70 covers bottom surface 62 of piston assembly 60 and extends around the peripheral outer wall of piston assembly 60. Peripheral edge 72 is mounted over open end 47 Of lower cylindrical member 44, in the preferred embodiment. Peripheral edge 72 is sandwiched between cylindrical members 44 and 48. Peripheral edge 72 can also be fixed to internal wall 42 of housing assembly 40 in other manners. Flexible diaphragm skirt 70 is secured to bottom surface 62 with upper and lower plates 74, and 76. Upper plate 74 has threaded central opening 75. Lower plate 76 has threaded central opening 77. Upper plate 74 is rigidly mounted to bottom surface 62 of piston assembly 60. External threaded portion 68 of lower end 67 passes through central opening 61, engage threaded central opening 75, central opening 71 and engage to threaded central opening 77, as best seen in FIGS. 1 and 2.

As best seen in FIG. 3, restricting valve assembly 80 is removably mounted to central through opening 69 of elongated tubular shaft 64 next to end 65. Restricting valve assembly 80 rests inside recess 169. Restricting valve assembly 80 includes central through opening 81, upper and lower ends 82 and 84, longitudinal channels 86, and O-ring 88. Through opening 81 has a considerably smaller diameter than central through opening 69 of elongated tubular shaft 64. With the reduced diameter of through opening 81, restricting valve assembly 80 restricts the flow of water inside elongated tubular shaft 64. Varying the diameter of opening 81 changes the time it takes piston assembly 60 to travel inside cylindrical members 44 and 48. Therefore, a user can regulate this time by replacing valve assemblies 80 of different diameters.

As seen in FIG. 1, the pressure differential created by electrical suction pump 50 at bottom outlet port 25 suctions the water in cavity 23 causing water to go through cutout 41 from space 43. The water displace from space 43 is replaced with water coming from through inlet through opening 32. Piston assembly 60 is allowed to move towards cover assembly 30 as water passing through opening 69 enters space 43 below bottom wall 62. The speed at which piston assembly 60 moves upwardly depends on the flow rate of water through restricting valve assembly 80. Water enters the space 43 to permit piston assembly 60 to move up. When top surface 63 of piston assembly 60 reaches cover assembly 30, valve assembly 38 is opened permitting water to enter to inlet through opening 34 and closing inlet through opening 32. Since piston 60 stops moving up at the extreme position, no more water comes in space 43'.

As best seen in FIG. 3, filter cap assembly 90 is mounted to internal threaded portion 66 of elongated tubular shaft 64. Filter cap assembly 90 includes central opening 91, upper end 92, stopper flange 93, lower end 94, threaded portion 95 and mesh 96. Its purpose is to keep restricting valve assembly 80 in place and filter the water to prevent clogging opening 81. When suction pump 50 stops, valve assembly 80 moves upwardly against end 94 by the pressure exerted on the water in space 43' by the weight of piston assembly 60. Upper end 82 comes in contact with lower end 94 and O-ring 88 is separated from its seat allowing water to go up with a larger effective diameter since in addition to opening 81 the water will flow through channels 86.

Figure 4:
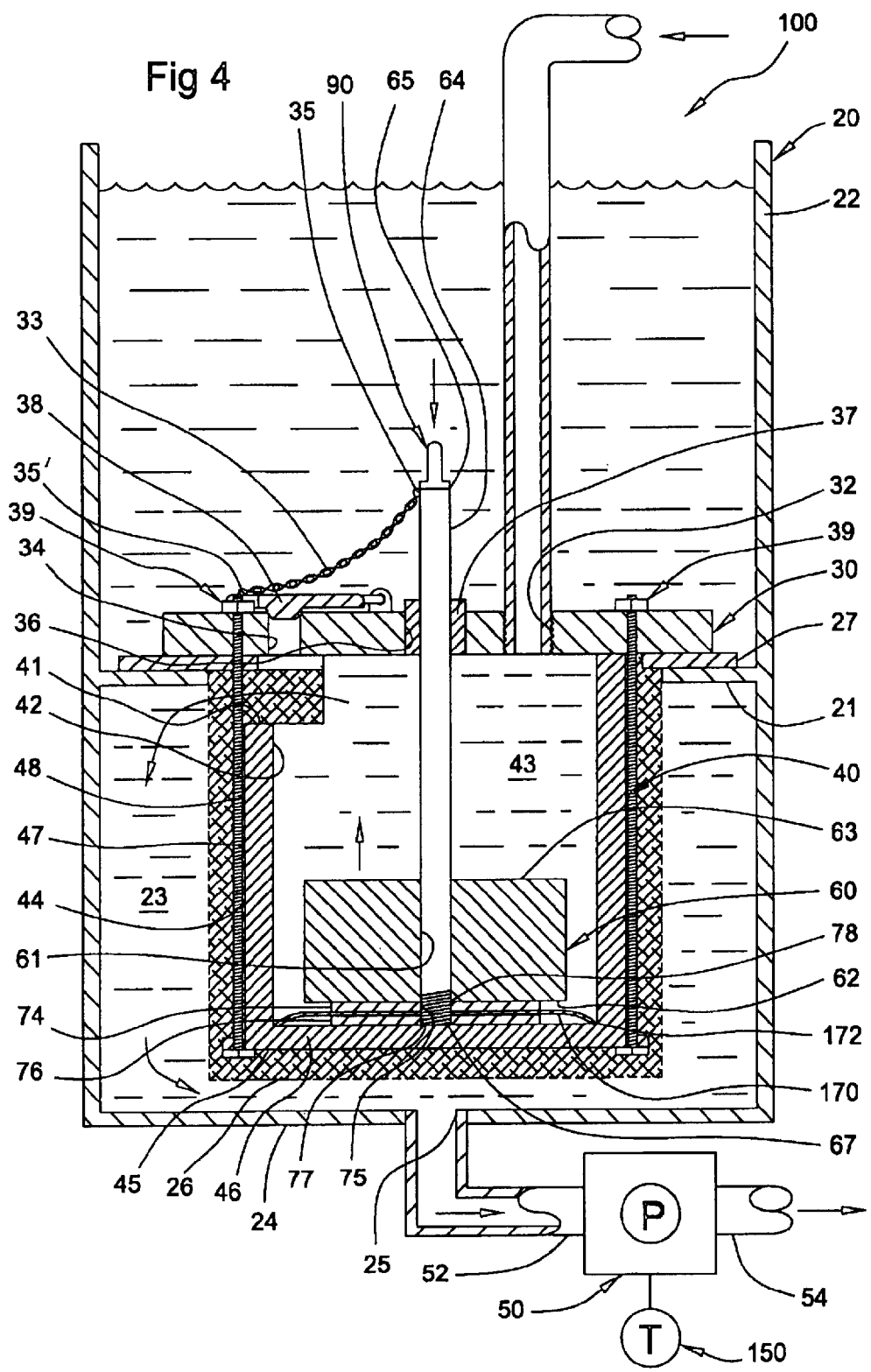
FIG. 4 is a representation of a partial cross-sectional view of an alternate embodiment for the present invention, wherein the diaphragm has an inverted cup shape.

An alternate embodiment for pool cleaner control device 100 is shown in FIG. 4, wherein flexible diaphragm skirt 170 has a substantially inverted cup shape with cooperative dimensions to cover bottom surface 62 of piston assembly 60. The peripheral edge 172 coacts with the internal wall surface of housing assembly 40 to effectively and substantial seal space 43' from space 43.

Figure 5:
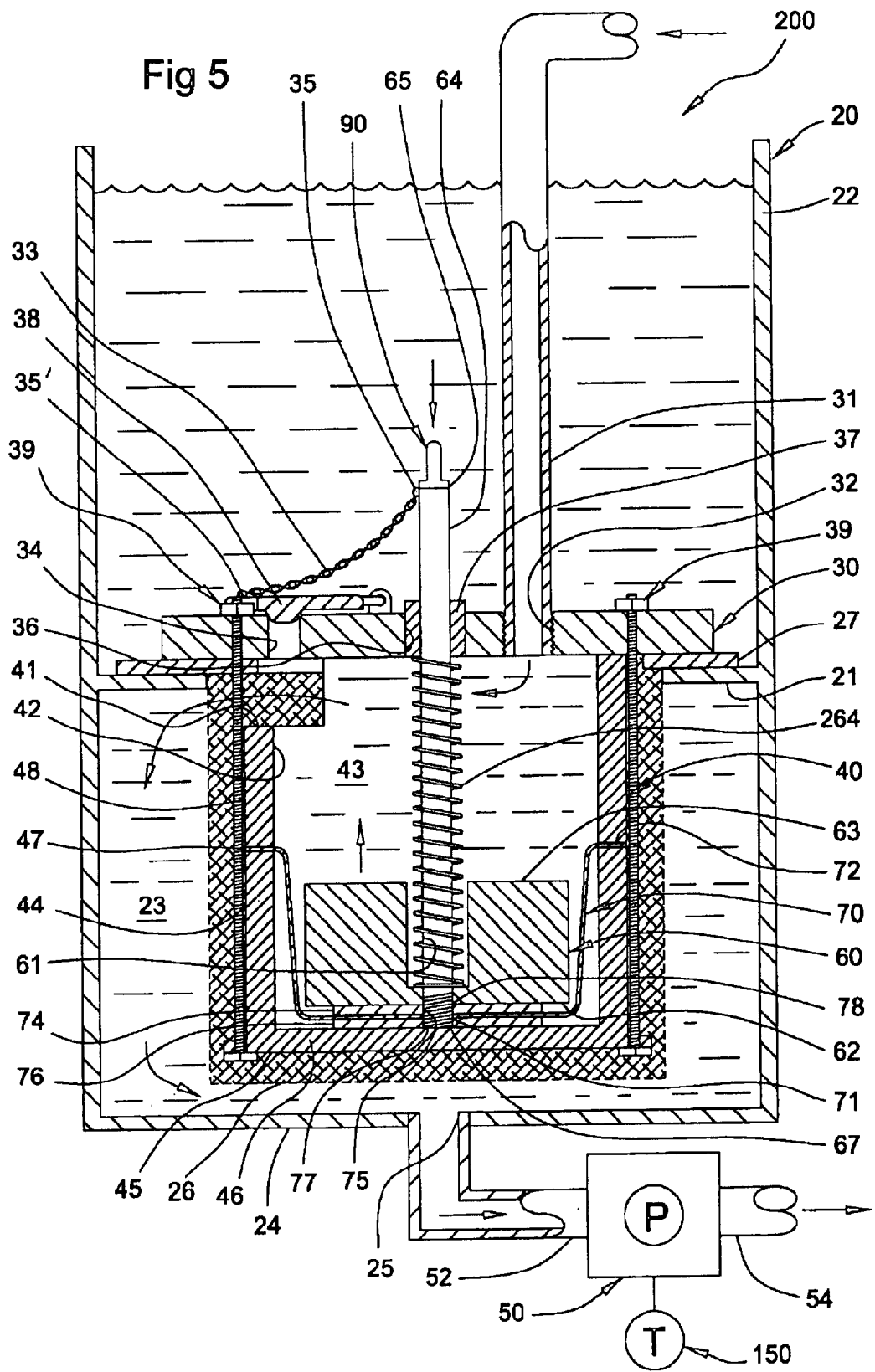
FIG. 5 shows of a partial cross-sectional view of other alternate embodiment for the present invention, wherein a spring member is used.

It is also possible to use a spring 264 to urge piston assembly 60 against bottom wall 46 if the pulling force of the water current is two strong, as shown alternate embodiment 200 represented in FIG. 5.

Skimmers 20 are typically used with a timer that can be regulated to stop the operation at predetermined time periods. In one preferred setting, the timer period is chosen to operate each inlet port for substantially equal time periods. This requires selecting a predetermined diameter for opening 81, and the characteristics of spring 264 if one is used.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pool cleaner control device comprising:
   A) a skimmer assembly submerged in a body of water and having first housing means with a bottom wall including a bottom outlet port and a filter basket assembly mounted within said first housing means;
   B) cover means mounted over said filter basket assembly having first and second inlet through openings and a shaft through opening, said cover means further including valve means for selectively closing said first inlet through opening;
   C) second housing means including an internal wall and a bottom wall, and said second housing means being mounted below said cover means and within said filter basket assembly;
   D) piston means including a bottom surface and a top surface and being mounted within said second housing means, said piston means being axially movable within said second housing means and further including an elongated tubular shaft with first and second ends said first end mounted through said piston means and extending to said bottom surface and said shaft slidably passing through said cover means with said second end extending outwardly through said shaft through opening a predetermined distance above said cover means and inside said body of water;
   E) a flexible diaphragm skirt having a substantially hemispherical shape and including a peripheral edge, said diaphragm skirt mounted to and covering said bottom surface, and said peripheral edge mounted to said internal wall to prevent water inside said second housing and below said diaphragm skirt from passing above said diaphragm skirt;

F) means for restricting the diameter inside said elongated tubular shaft so that water enters through said second inlet through opening and through said second end thereby forcing said piston means to move towards said cover means and when said piston means reaches said cover means said valve means is opened permitting water to enter to said first inlet through opening and closing said second inlet through opening; and G) a suction pump having an inlet connected to said bottom outlet port so that water displaced from said first housing means is replaced with water passing through a cutout and said filter basket assembly from said second housing and the space left is taken by water passing through said second inlet opening and by said piston means being urged upwardly and limited by said restricting means until said piston means reach said cover means and said actuating means cause said valve means to open.

2. The device set forth in claim 1 further including:

H) spring means for urging said piston means away from said cover means.

3. The device set forth in claim 2 wherein said actuating means includes a flexible means having third and fourth ends with said third end being attached to said second end and said fourth end being cooperatively engaged to said valve means to cause said valve means to open and close in response to the position of said second end.

4. A pool cleaner control device comprising:

A) a skimmer assembly submerged in a body of water and having first housing means with a bottom wall including a bottom outlet port and a filter basket assembly mounted within said first housing means;

B) cover means mounted over said filter basket assembly having first and second inlet through openings and a shaft through opening, said cover means further including valve means for selectively closing said first inlet through opening;

C) second housing means including an internal wall and a bottom wall, and said second housing means being mounted below said cover means and within said filter basket assembly;

D) piston means including a bottom surface and a top surface and being mounted within said second housing means, said piston means being axially movable within said second housing means and further including an elongated tubular shaft with first and second ends said first end mounted through said piston means and extending to said bottom surface and said shaft slidably passing through said cover means with said second end extending outwardly through said shaft through opening a predetermined distance above said cover means and inside said body of water;

E) a flexible diaphragm skirt having substantially the shape of a cup and including a peripheral edge, said diaphragm skirt mounted to said bottom surface, said peripheral edge cooperatively coacting with said internal wall to prevent water inside said second housing and below said diaphragm skirt from passing above said diaphragm skirt;

F) means for restricting the diameter inside said elongated tubular shaft so that water enters through said second inlet through opening and through said second end thereby forcing said piston means to move towards said cover means and when said piston means reaches said cover means said valve means is opened permitting water to enter to said first inlet through opening and closing said second inlet through opening; and G) a suction pump having an inlet connected to said bottom outlet port so that water displaced from said first housing means is replaced with water passing through a cutout and said filter basket assembly from said second housing and the space left is taken by water passing through said second inlet opening and by said piston means being urged upwardly and limited by said restricting means until said piston means reach said cover means and said actuating means cause said valve means to open.

5. The device set forth in claim 4 further including:

H) spring means for urging said piston means away from said cover means.

6. The device set forth in claim 5 wherein said actuating means includes flexible means having third and fourth ends with said third end being attached to said second end and said fourth end being cooperatively engaged to said valve means to cause said valve means to open and close in response to the position of said second end.

* * * * *